United States Patent
Tominaga et al.

[11] Patent Number: 6,088,534
[45] Date of Patent: Jul. 11, 2000

[54] CAMERA HAVING AN APERTURE CONTROLLABLE SHUTTER

[75] Inventors: Shinji Tominaga, Minamikawachi-Gun; Takehiro Katoh, Nara; Takashi Okada, Osaka; Hiroyuki Okada; Dai Shintani, both of Sakai; Katsuyuki Nanba, Osakasayama, all of Japan

[73] Assignee: Minolta Co., Ltd., Osaka, Japan

[21] Appl. No.: 08/260,485

[22] Filed: Jun. 15, 1994

Related U.S. Application Data

[63] Continuation of application No. 07/762,875, Sep. 19, 1991.

[30] Foreign Application Priority Data

Sep. 19, 1990 [JP] Japan .................................... 2-251601
Sep. 19, 1990 [JP] Japan .................................... 2-251603

[51] Int. Cl.$^7$ ........................................................ G03B 7/00
[52] U.S. Cl. ................................................ 396/64; 396/449
[58] Field of Search ................................. 354/435–455, 354/195.1, 195.12, 195.13, 195.11; 396/63, 64, 449

[56] References Cited

U.S. PATENT DOCUMENTS

| | | | |
|---|---|---|---|
| 4,794,418 | 12/1988 | Kabayashi et al. | 354/435 |
| 4,899,191 | 2/1990 | Maruyama | 354/435 |
| 4,945,380 | 7/1990 | Katoh et al. | 354/443 |
| 4,959,680 | 9/1990 | Ishida et al. | 354/435 |

FOREIGN PATENT DOCUMENTS 63-300226  12/1988  Japan .
1-158418   6/1989   Japan .

*Primary Examiner*—Russell Adams
*Attorney, Agent, or Firm*—Sidley & Austin

[57] ABSTRACT

A camera provided with an aperture controllable shutter capable of determining exposure by varying aperture movement, and a photographic lens capable of varying focal length. In accordance with the focal length of the photographic lens, an aperture size or an aperture characteristic of the aperture controllable shutter is determined. A diaphragm of the aperture controllable shutter is driven based on the determined aperture size, aperture characteristic and object brightness.

10 Claims, 17 Drawing Sheets

Fig. 10A

| PULSE MODE | LOWER BIT | | | | | | |
|---|---|---|---|---|---|---|---|
| | 0 | 1 | 2 | 3 | 4 | 5 | 6 |
| UPPER BIT 0 | 4 | 4 | 4 | 4 | 4 | 4 | 4 |
| UPPER BIT 1 | 2 | 2 | 2 | 2 | 2 | 2 | 2 |
| UPPER BIT 2 | 2 | 2 | 2 | 2 | 2 | 2 | 2 |
| UPPER BIT 3 | 10 | 8 | 6 | 4 | 2 | 2 | 2 |

SHUTTER DRIVING PULSE WIDTH (ms)

| CONTROL VALUE Ev | PULSE NUMBER | STOP TIME (ms) |
|---|---|---|
| 7 | 6 | 80 |
| 8 | 6 | 30 |
| 9 | 6 | 4 |
| 10 | 4 | 2 |
| 11 | 3 | 2 |
| 12 | 2 | 3.5 |
| 13 | 2 | 2 |
| 14 | 2 | 1 |
| 15 | 1 | 4 |
| 16 | 1 | 3.2 |
| 17 | 1 | 2.5 |

Fig. 10B f=36.2 f=39.3

CAMERA HAVING AN APERTURE CONTROLLABLE SHUTTER

This application is a continuation of application Ser. No. 07/762,875, filed Sep. 19, 1991.

BACKGROUND OF THE INVENTION

The present invention relates to a camera provided with an aperture controllable shutter capable of controlling the size of an aperture for optimum exposure and a vari-focal lens system, e.g. a zoom lens or two-focus lens.

The aperture controllable shutter has widely been used as a lens shutter of a low-cost common camera. Such common cameras are now highly improved in the performance and some are even equipped with vari-focal lens systems such as zoom lenses. Also today's vari-focal lens systems have a broad focusing range from wide angle to telephoto.

However, when such a broad-range vari-focal lens is adopted, an aberration in peripheral areas of a photographing plane tends to increase particularly at wide-angle side, and amount of light exposure tends to be lower. For compensation, the lens system has to be designed in complicated structure, resulting in an increase in the production cost.

In this respect, a modification is proposed (as disclosed in Japanese Laid-open Patent Publication No.63-300226 in which the aperture (the diameter of an aperture) of an aperture controllable shutter is allowed to open small at the wide-angle side so that an increase in the aberration and a declination of the amount of light exposure can be minimized. More particularly, a controller member is provided for entering into the moving path of the aperture controllable shutter or its linked mechanism so that the changeable amount of the aperture (or the aperture controllable shutter) size can be restricted corresponding to a change in the focal length.

That arrangement may eliminate the foregoing drawback, but becomes bulky in size because the controller member is added for mechanical movement at each focal length variation and the lens system itself is enlarged for accommodating such a modified shutter mechanism.

SUMMARY OF THE INVENTION

It is an object of the present invention to provide a simpler and lower cost improvement for eliminating the same drawback.

The present invention realizes the above noted objects by providing a camera having an aperture controllable shutter and a variable focus lens.

In accordance with the present invention, a camera comprises a variable focus lens for photographing to be set in a desirable focal length, in which the set focal length of the lens is detected, and the size of an aperture of the aperture controllable shutter is determined in accordance with the detected focal length. Further, the brightness on an object to be taken is measured, and the diaphragm of the aperture controllable shutter for opening the aperture is actuated. Furthermore, the movement of the diaphragm of the aperture controllable shutter is determined in accordance with the determined aperture size or aperture characteristic and the object brightness.

BRIEF DESCRIPTION OF THE DRAWINGS

FIGS. 10A and 10B are data stored in a ROM table;

DESCRIPTION OF THE PREFERRED EMBODIMENT

The operation of a camera according to the present invention will now be described referring to the accompanying drawings.

Figure 1:
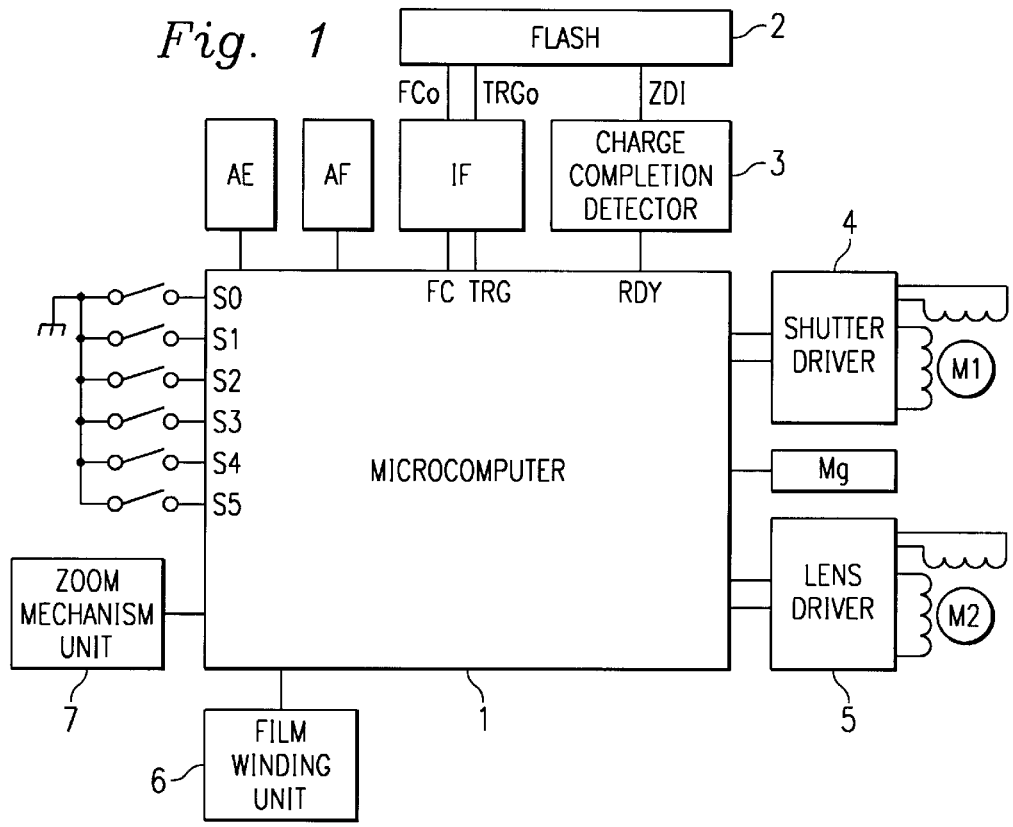
FIG. 1 is a block diagram of a circuitry arrangement of a camera in accordance with the present invention.

FIG. 1 is a block diagram showing a circuit arrangement of the camera in which sequence control is carried out by a microcomputer 1. The microcomputer 1 receives operation signals from a group of switches S0 to S5. More specifically, when the main switch S0 is closed, the camera is turned ON. When a shutter release button of the camera is pressed down to a first press-down position, the light metering and distance measurement switch S1 turns ON. When the shutter release button is pressed down to a second press-down position, the shutter release switch S2 gets closed. The zoom-in and zoom-out switches S3, S4 are turned ON or OFF using their respective zoom button switches. The mode selecting switch S5 is provided for selecting a photographing mode, which will be described later in more detail.

Figure 2:
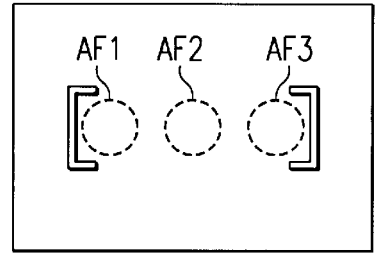
FIG. 2 is a view showing a distance measuring range in a picture frame of the camera.

A light metering unit AE measures the brightness of an object area and transmits its measurement to the microcomputer 1. A distance measurement unit AF measures the distance to an object and transmits its measurement to the microcomputer 1. The measurement of the object distance is executed at the three metering areas of a picture frame; center AF2, right AF3, and left AF1 denoted by the dotted circles in FIG. 2. A flash unit 2 is coupled via an interface IF and a charge-completion detector 3 to the microcomputer 1. The flash unit 2 contains a high-voltage circuit, a capacitor, and a xenon tube for charging the capacitor and emitting a flash light in response to control signals supplied from the terminals FC and TRG of the microcomputer 1 through the interface IF. When the capacitor is filled up, a flash-ready signal is transmitted from the charge-completion detector 3 to the terminal RDY of the microcomputer 1.

A stepping motor M1 for shutter drive, i.e. aperture opening (which are hereinafter referred to as shutter drive) is also controlled via a driver 4 by the microcomputer 1. Similarly, a stepping motor M2 for lens drive is controlled via a driver 5 by the microcomputer 1. A film winding unit 6 and a zoom mechanism 7 are coupled to the microcomputer 1 for performing film winding and rewinding and for driving a zoom lens, respectively. A magnet Mg is provided for preventing the generation of ringing or vibration during the stop motion of the shutter at a desired location and, thus, serves as a member of a plunger system described later.

Figure 3:
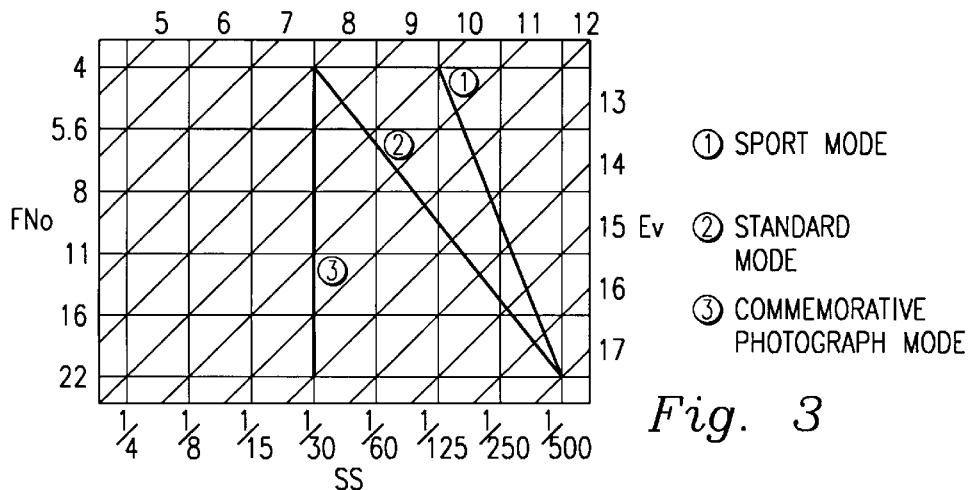
FIG. 3 is a diagram showing three program lines for shutter control of the camera.

FIG. 3 shows three program lines for shutter aperture control of the camera. In the camera, an optimum program line is automatically selected by changing the rise-up characteristic of the shutter movement corresponding to the purpose of photographing. As shown in FIG. 3, the program line ① is prepared for taking a sports picture or a portrait (in the sports mode), the program line ② is for taking a standard photograph (in the standard mode), and the program line ③ is for taking a commemorative photograph (in the commemorative photograph or pseudo soft-focus mode).

The sports program line ① is in a higher shutter-speed range than the standard program line ②. The commemorative photograph mode program line ③ is in a lower shutter-speed range than the standard program line ②, holding a minimum aperture size from a maximum shutter speed of $1/500$ second to a minimum of $1/30$ second designated as a camera shake limit, and will thus be used for producing a broad depth of field picture such as a commemorative photograph. When the exposure control value Ev is less than 8, the shutter speed is set to $1/30$ second at the aperture of F4 and a flash light is emitted.

Figure 4A:
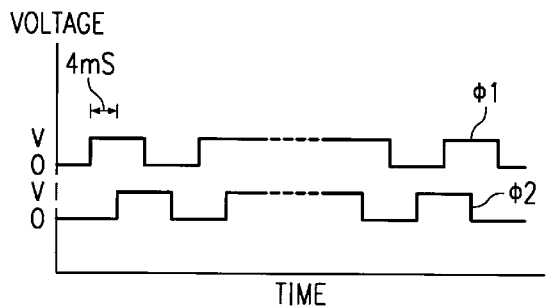
FIGS. 4A and 4B are diagrams showing a signal waveform for shutter drive and a changing form of an aperture respectively in a standard mode.
Figure 4B:
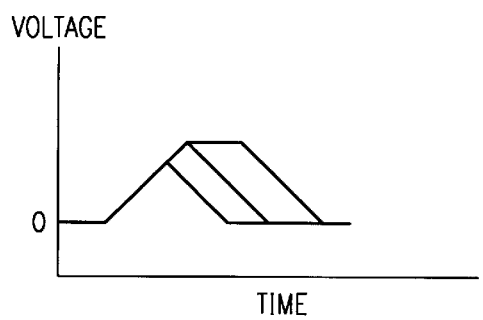
Figure 4C:
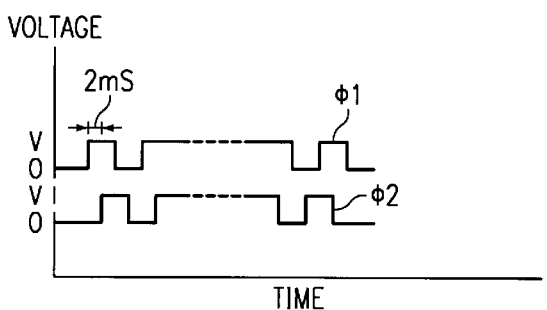
FIGS. 4C and 4D are diagrams showing changing form of the same in a sports mode.
Figure 4D:
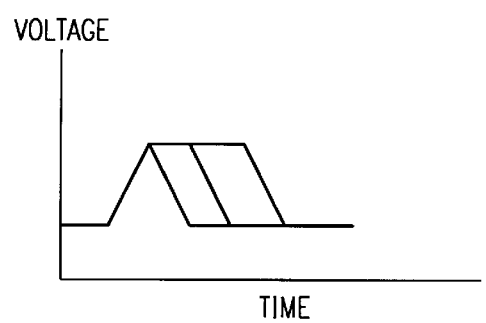
Figure 4E:
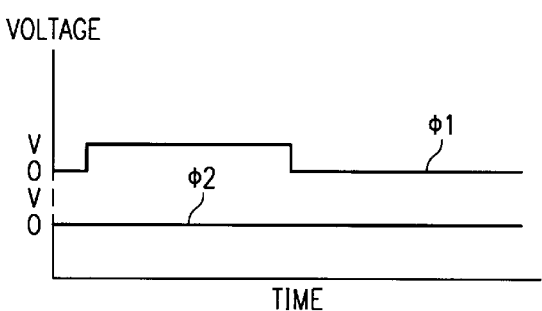
FIGS. 4E and 4F are diagrams showing changing form of the same in a commemorative photograph mode.
Figure 4F:
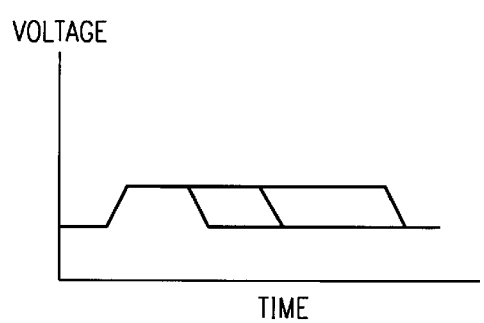
Figure 4G:
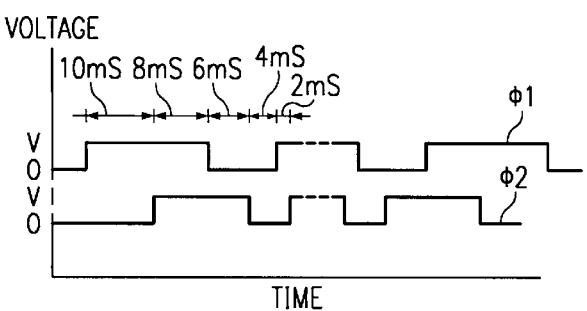
FIGS. 4G and 4H are diagrams showing changing form of the same in a soft focus mode.
Figure 4H:
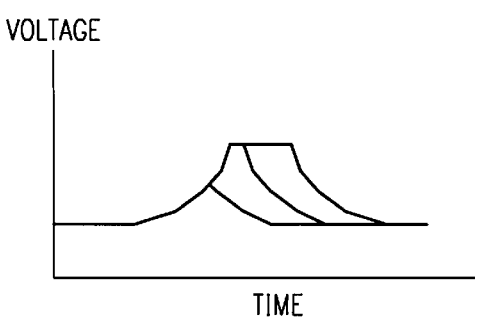

FIGS. 4A–4H illustrate the waveforms of signals for driving the shutter blade and an aperture size of the camera. The shutter drive stepping motor M1 is of two-phase drive type, and the waveforms of the two corresponding pulses for phase $\phi1$ and $\phi2$ are separately illustrated as the upper and lower waveforms in FIGS. 4A, 4C, 4E, and 4G. More particularly, FIG. 4A shows the shutter drive waveforms in the standard mode, FIG. 4C shows the shutter drive waveforms in the sports mode, FIG. 4E shows the shutter drive waveforms in the commemorative photograph mode, and FIG. 4G shows the shutter drive waveforms in the pseudo soft focus mode, while FIGS. 4B, 4D, 4F, and 4H show the aperture waveform for the standard mode, the sports mode, the commemorative mode, and the pseudo soft focus mode, respectively. As apparent, in the sports mode, a pulse of shorter duration is provided for activating the shutter drive stepping motor M1 than that of the standard mode and its aperture waveform exhibits sharp rise and decay. In the commemorative photograph mode, only one pulse is provided and the aperture is limited to as small as F22. In the soft focus mode, the drive pulse is set to be a long pulse width when the aperture is small at the initial stage and to be a short pulse width as the aperture becomes large. Accordingly, the aperture changing form exhibits a shutter release curve rising moderately in the beginning and then, elevating sharply towards the end of the action. For closing action of the shutter, the pulse decays sharply and then, moderately. In accordance with the changing form of a shutter aperture like this, a core is made in an out-of-focus-image, thereby an unsharp photograph, as if being taken with soft focus, can be obtained.

Figure 5:
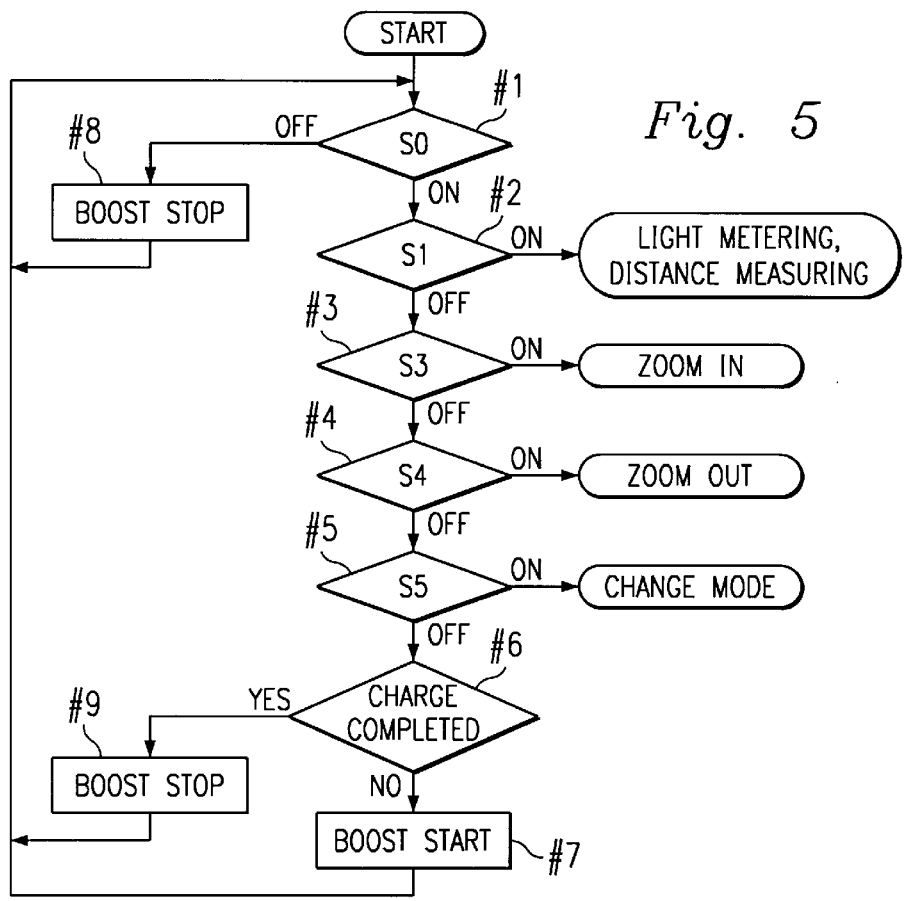
FIG. 5 is a flow chart showing a sequence of actions of the camera.

FIG. 5 is a flow chart showing a sequence of actions of the camera. The action of each step will be explained referring to the flow chart. When the camera is loaded with a battery(s), "START" sequence is carried out, and whether the main switch S0 ON or OFF is examined (Step #1). If the main switch S0 is ON, the light metering and distance measurement switch S1 is examined (Step #2). If the switch S1 is ON, the procedure moves to a routine for light metering and distance measurement. If OFF, the zoom-in switch S3 is then examined (Step #3). In a similar manner, both the zoom-out and mode selecting switches S4, S5 are examined (Steps #4 and #5). If either one is ON, the procedure goes to a routine for "zoom-in", "zoom-out", or "mode selection" in due course respectively. If all of the switches S1 to S5 are OFF, the capacitor for flash emission is examined for charge up (Step #6). If the capacitor is fully charged or the flash unit is ready for flash emission, the boost action is ceased (Step #9). Then, the procedure returns to Step #1 for repeat of the foregoing steps. When the main switch S0 is OFF at Step #1, the boost action is stopped (Step #8) and the procedure is returned back to Step #1.

Figure 6:
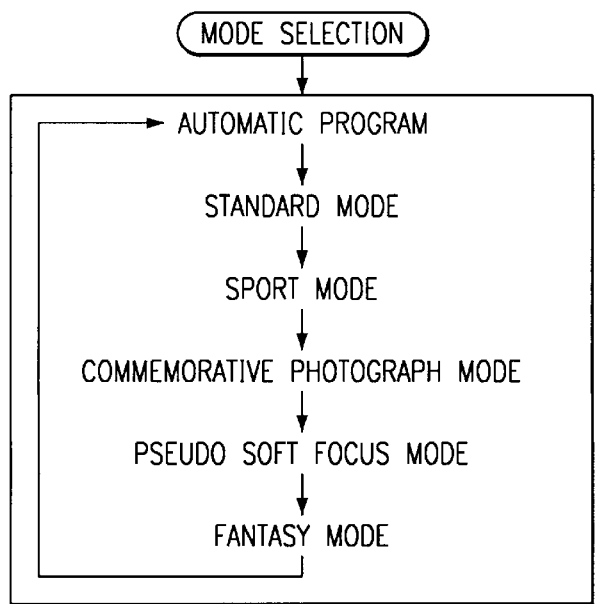
FIG. 6 is a flow chart of mode selection.

FIG. 6 is a flow chart of the "mode selection" procedure in which five different modes for photographing are prepared with the camera; namely, standard mode, sports mode, commemorative photograph mode, pseudo soft focus mode, and fantasy mode. The fantasy mode provides a pseudo soft filter effect or a zooming action in exposure time through driving a focusing lens during the exposure. In "mode selection", a mode can be selected from six modes consisting of the five photographing modes and an "automatic program" mode described later. As the mode selecting switch S5 is pressed, the mode shifts from automatic program to standard, sports, commemorative photograph, pseudo soft focus, and fantasy, as shown in FIG. 6. The automatic program mode is for automatically selecting one of the three, standard, sports, and commemorative photograph, modes corresponding to a measurement of the distance to the object. The "zoom-in" and "zoom-out" routines provide variations of the focal length.

Figure 7:
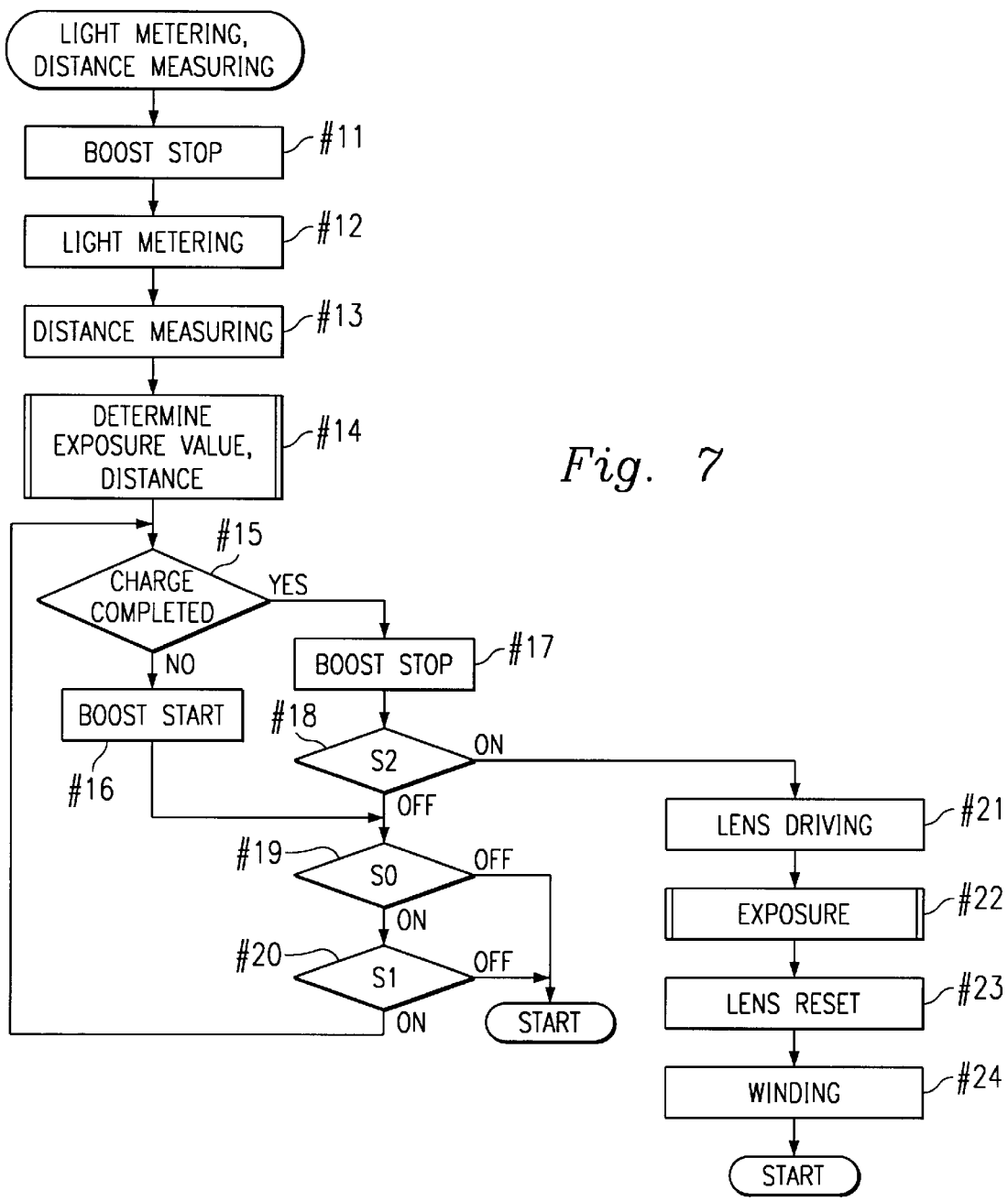
FIG. 7 is a flow chart of light metering and distance measurement.

FIG. 7 is a flow chart of the procedure from light metering and distance measurement to shutter release. In the beginning, the boost in the flash unit is stopped (Step #11). Light metering and distance measurement are then carried out respectively (Steps #12 and #13) and from the result of measurements, the exposure value and the object distance are determined (Step #14). The capacitor for flash emission is examined for full voltage charging (Step #15). If needed, a voltage boosting is executed (Step #16) and the main switch S0 and the light metering/distance measuring switch S1 are examined (Steps #19 and #20). If the switch S0 or S1 is OFF, the procedure returns to "START" of FIG. 5. If the two switches S0 and S1 are ON, the procedure goes back to Step #15 and repeats the foregoing steps. When the voltage of the capacitor for flash emission is as high as a given level at Step #15, the boosting stops (Step #17) and the release switch S2 is examined as to whether it is ON or OFF (Step #18). If OFF, the procedure advances to Step #19 and the above steps are repeated. If ON, the lens driving is carried out (Step #21) according to the object distance determined at Step #14. Then, the shutter is released for exposure, as described later (Step #22). After the exposure is completed, the lens is reset (Step #23) and the film is advanced one frame (Step #24), and the procedure returns to "START".

Figure 8:
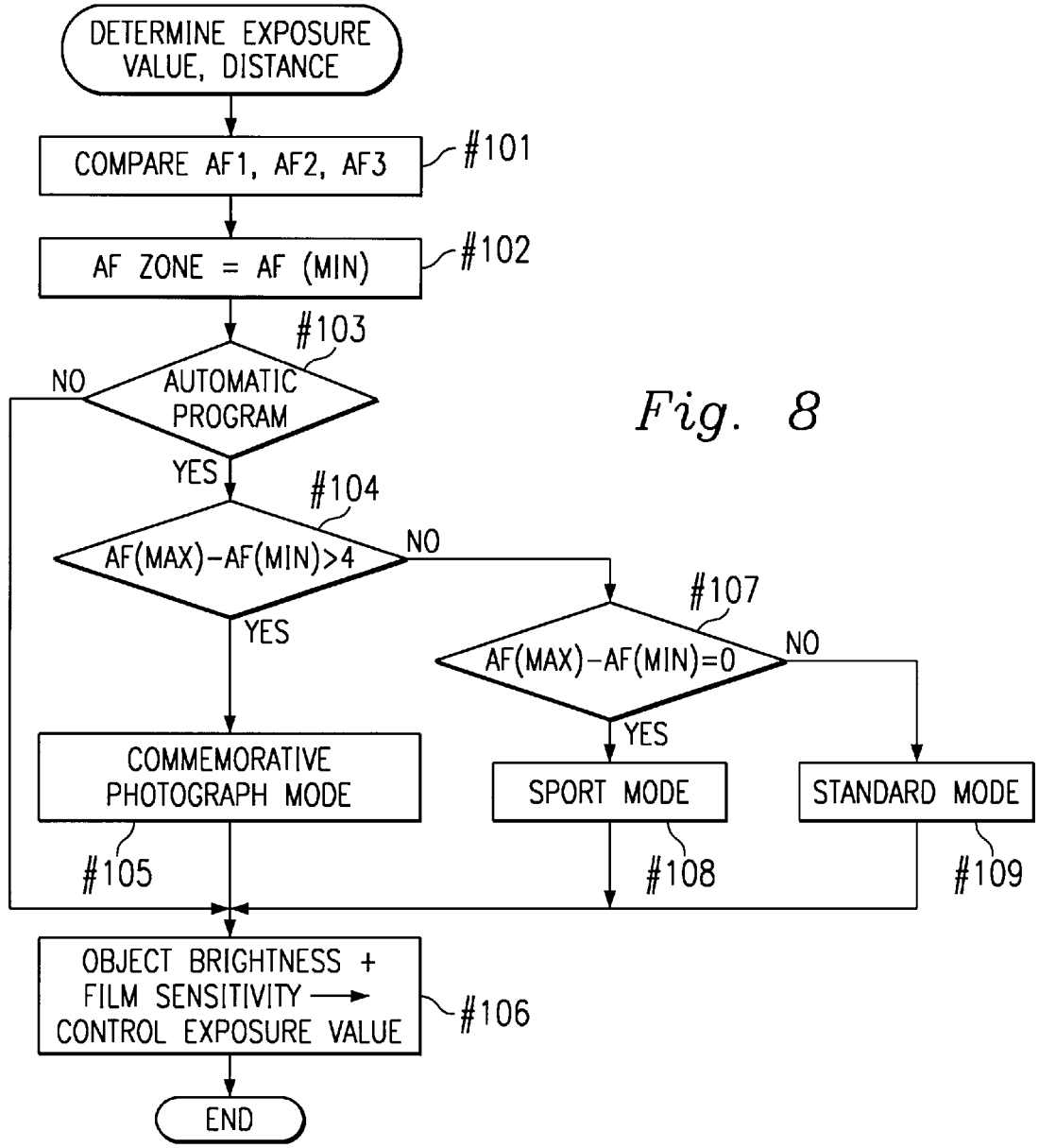
FIG. 8 is a flow chart of determining an exposure value and an object distance.

FIG. 8 is a flow chart of the procedure of determining the exposure value and the object distance. The procedure starts with comparison between three object distance data measured at the left area AF1, the center area AF2, and the right area AF3 of the picture frame respectively (Step #101). The nearest data is then designated as an object distance for focus control (Step #102). The photographing mode is examined whether it is "automatic program" or not (Step #103). If the automatic program mode is not selected, the procedure moves to Step #106 where the exposure value is calculated from the brightness on the object measured in the previous light metering step and the film sensitivity.

When the automatic program mode is selected at Step #103, the procedure goes to Step #104 where the furthest data of the three distance measurements is compared with the nearest data. If the difference between the two data is more than 4 zones, it is judged that a plurality of objects are located at both short and long distances and thus, a program line for smaller aperture to increase the depth of field, namely the commemorative photograph mode, is selected (Step #105). If the zone difference is found to be zero at Step #104, the objects are at almost the same distance and no broad depth of field is needed. Thus, a program line for higher shutter-speed or the sports mode is selected (Step #108). If the zone difference is more than 0 and less than 4, the standard mode is selected (Step #109). Then, the exposure value is determined at Step #106 and the procedure of determining the exposure value and the object distance will be finished.

Figure 9:
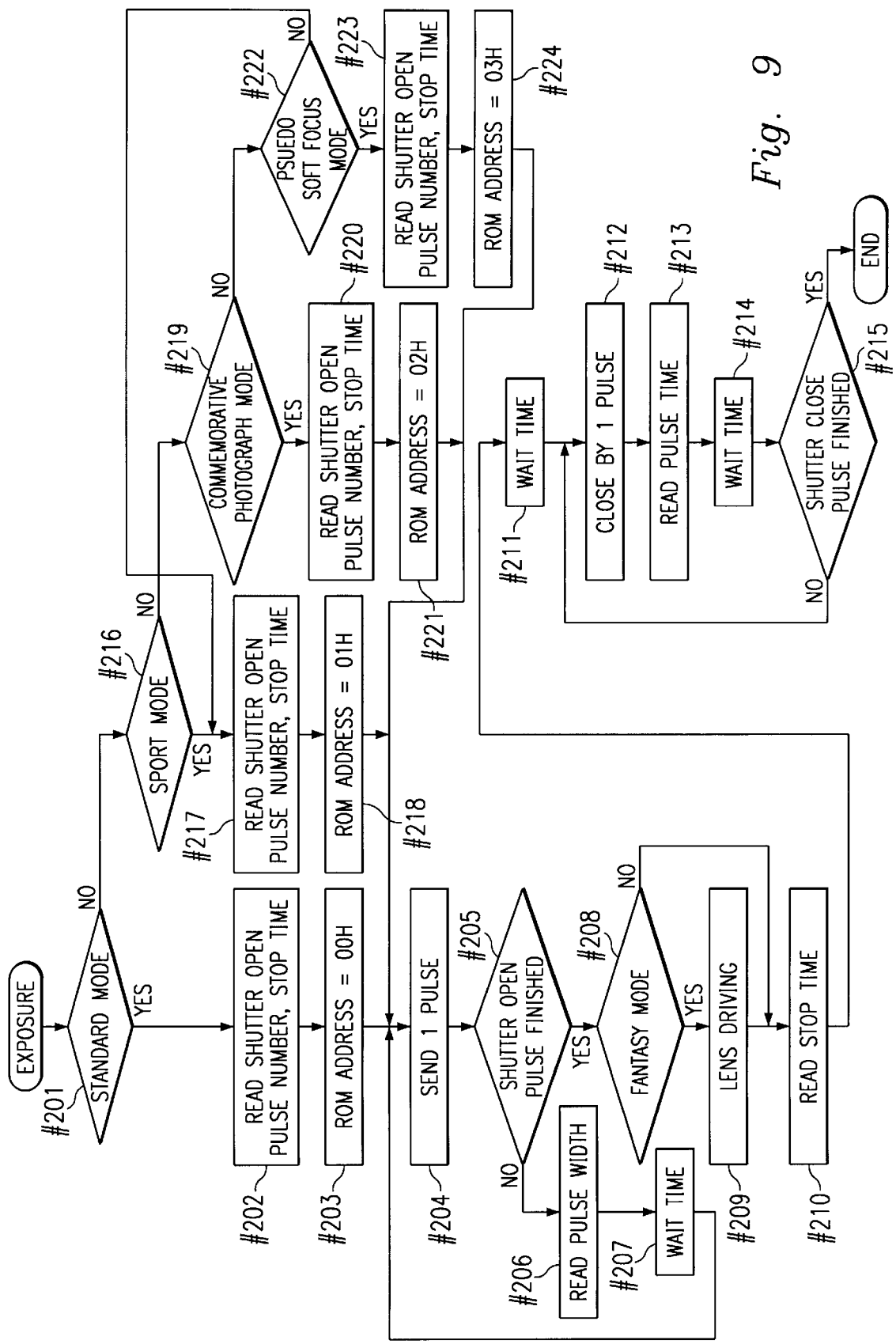
FIG. 9 is a flow chart of exposure control.

FIG. 9 is a flow chart of the procedure of exposure control. The procedure starts with detection of the photographing mode in use (Steps #201, #216, #219, and #222). If the standard mode is in use, the procedure goes to Step #202. If the sports or fantasy mode is in use, it moves to Step #217. If the commemorative photograph or pseudo soft focus mode is in use, the procedure goes to Step #220 or #223 respectively. The pulse number and stop time of each mode for opening the shutter blades are read from a ROM table shown in FIG. 10B (Step #202, #217, #220, or 223). The ROM address is then assigned to 00H, 01H, 02H, or 03H corresponding to the photographing mode and the procedure moves Step #204. The address numbers 00H to 03H are used for retrieving the pulse width in a given mode for actuating the shutter drive stepping motor M1 from an assignment list of the ROM table shown in FIG. 10A.

The relation between the pulse number and the stop time in the shutter releasing will now be described referring to FIG. 10B which illustrates an example of the ROM table for determining both the pulse number and the stop time from the shutter control value (Ev) in the standard mode. If the brightness of the object is Ev13, the microcomputer 1 actuates the stepping motor M1 to rotate 2-pulses to the shutter aperture opening direction, pauses for 2 ms, and rotate reversely by the same pulses to the shutter closing direction. If it is Ev8, the shutter is actuated by 6-pulses to the opening direction, 30-ms pausing, and by 6-pulse to the closing direction. In this manner, by varying the pulse number and the stop time even at the same control value, the shutter speed and the F number or aperture size can be changed. When the aperture of the shutter reaches a given size, the plunger system is activated for prevention of ringing.

FIG. 10A shows a table of the pulse width of a shutter drive signal. The row 0 of the upper bit group exhibits a pulse width in the standard mode, the row 1 is in the sports and fantasy modes, the row 2 is in the small-aperture mode, and the row 3 is in the pseudo soft mode. The lower bits 0 to 6 represent the first to seventh pulses respectively for opening the shutter.

Following is an explanation in the pseudo soft focus mode, and it is assumed that the pulse number and the stop time obtained by a shutter control value are 5-pulses and 4 ms respectively. The microcomputer 1 outputs a first pulse of 10-ms width for opening the shutter. Then, according to the data in the ROM table, a series of pulses are transmitted; a second pulse of 8-ms, a third pulse of 6-ms, and so on. After a pausing duration of 4 ms, the shutter closing is carried out by reflecting the pulses of the ROM table in a reverse sequence. As understood, through varying the pulse width, the pulse number, and the stop time, rise and decay characteristics of shutter opening are changed, and various kinds of forms of a shutter opening can be attained.

Referring back to FIG. 9, at Step #204, the shutter drive stepping motor M1 is activated a given pulse duration for opening the shutter. Then, it is examined whether the shutter drive of the pulse duration is completed or not (Step #205). If not, the shutter drive pulse width is called for (Step #206) and the procedure pauses to wait a predetermined time elapsing (Step #207). Then, the procedure goes back to Step #204 and the above actions are repeated. After the stepping motor M1 is driven by the numbers of the pulses for open, the procedure moves to Step #208 where the photographing mode is examined whether it is the fantasy mode or not. If YES, the focusing lens is moved by given steps for near or far side direction (Step #209) and the procedure goes to Step #210 where the stop time is called for. Then, it pauses to wait the above time elapsing (Step #211) and the shutter is closed by executing a reverse of the shutter opening pulse action (Steps #212 to #215).

Figure 11:
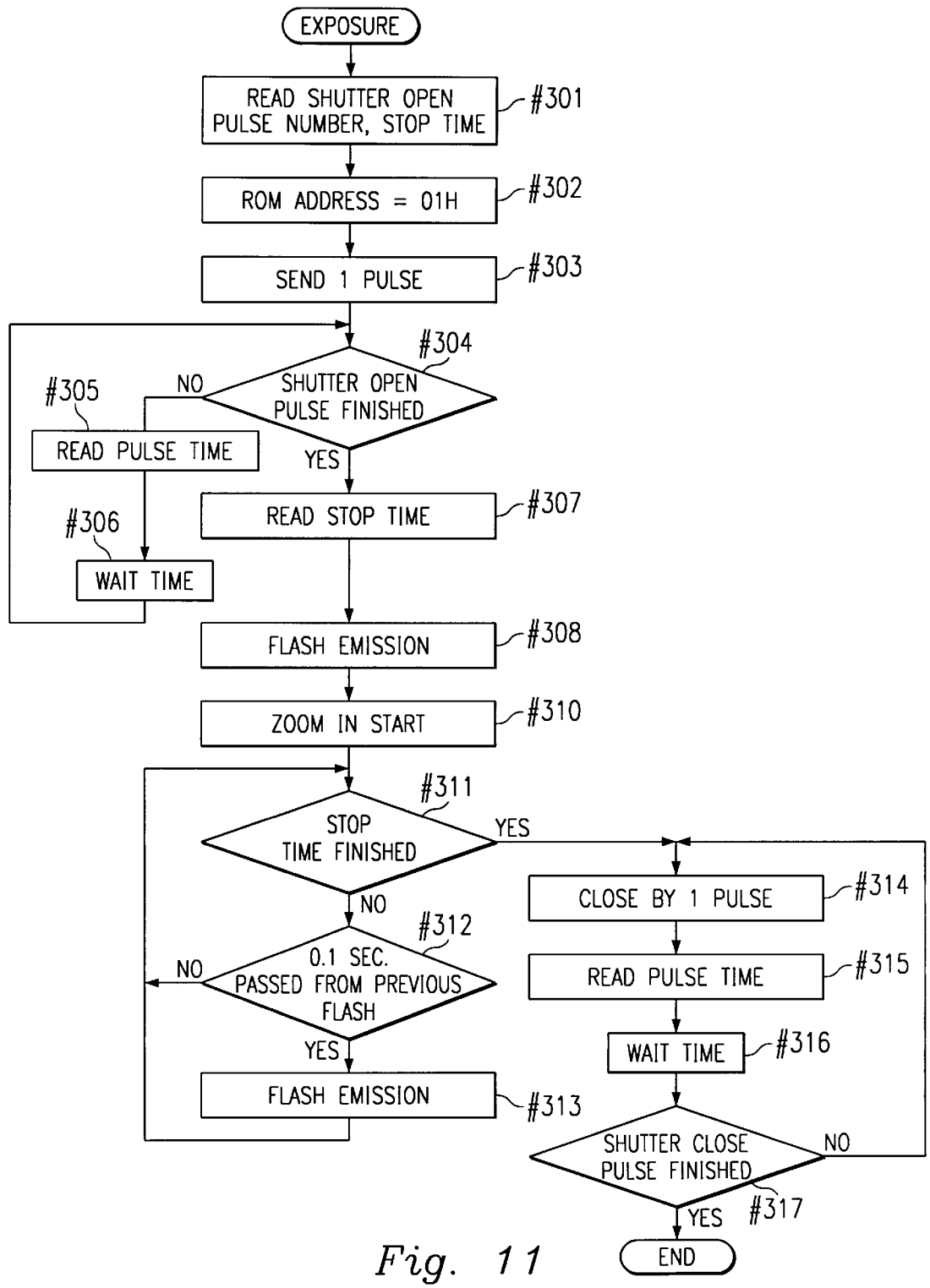
FIG. 11 is a flow chart showing another example of exposure control.

FIG. 11 is a flow chart showing another procedure of the exposure control for photographing with a flash light in the sports mode, in which the actions up to the opening of the shutter with a series of pulses are identical to those of the flow chart in the sports mode shown in FIG. 9. After the shutter aperture opening action for a given pulse duration, the flash emission starts at Step #308. The zoom lens is moved in a long focal length direction (Step #310). Then, the flash emission is carried out at intervals of 0.1 second until the stop time elapses (Steps #311, #312, and #313). After end of the stop time, a reverse of the shutter opening action is carried out for closing the shutter aperture. Accordingly, the photographing of a picture with zooming during the exposure time and emitting a series of flash lights can be performed.

Figure 12A:
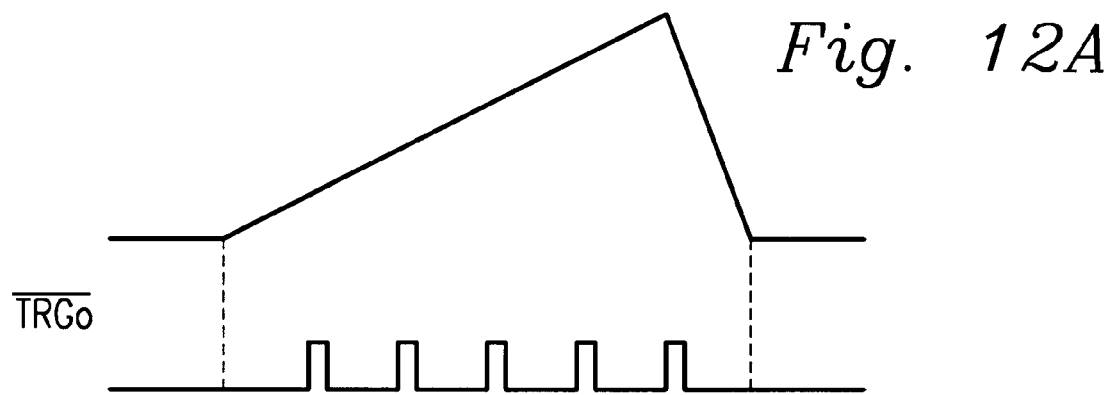
FIGS. 12A and 12B are diagrams showing the relation between changing form of a shutter aperture and flash emission.
Figure 12B:
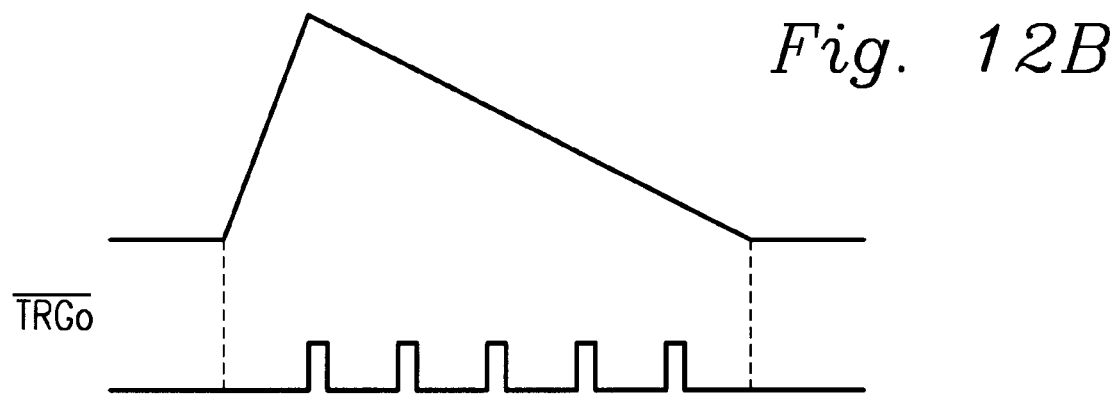

FIGS. 12A and 12B illustrate the relation between flash emission timing and form of the shutter aperture according to a further procedure of the exposure control in which a series of lights are emitted during the shutter opening and closing action. FIG. 12A shows the flash emission being carried out periodically during a slow aperture opening action. More specifically, the aperture is small at the beginning and becomes larger gradually as a series of lights are emitted. As the result, an object illuminated in the beginning is photographed in dim while an object illuminated later is clear and bright. FIG. 12B shows a reverse of the action shown in FIG. 12A, in which the shutter aperture closing action is slow and flash emission is carried out periodically during the closing time. Thus, objects illuminated later are photographed less clearly. Accordingly, when the object moves during photographing, a fade-in effect for gradual appearance of the object and a fade-out effect for gradual disappearance of the object will be feasible in the former and latter actions respectively.

Figure 13:
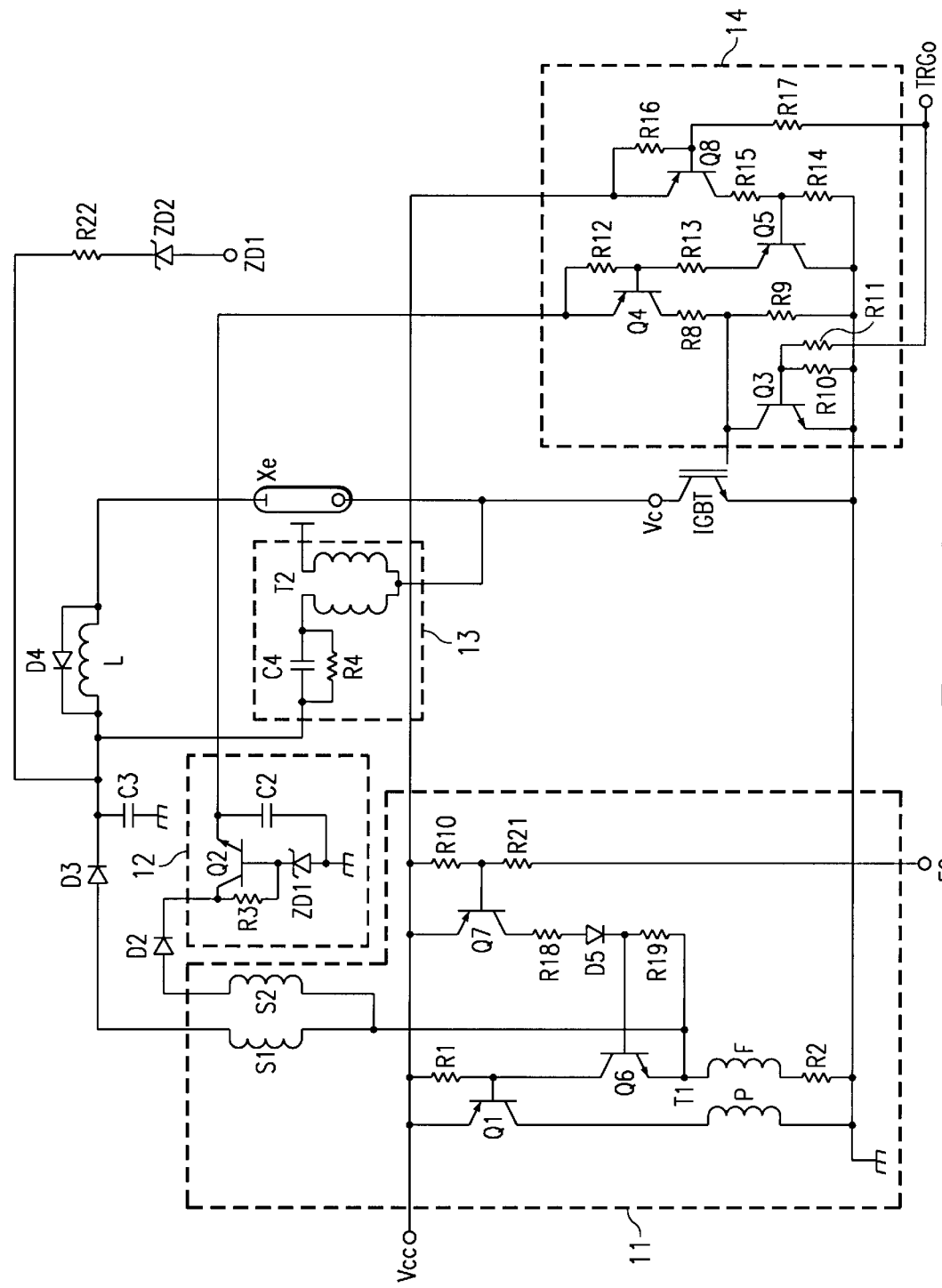
FIG. 13 is a circuit diagram of a flash unit of the camera.

FIG. 13 is a circuit diagram of the flash unit 2 which comprises a DC/DC converter is for boosting the supply voltage Vcc to charge a main capacitor C3, a constant voltage generator circuit 12, a trigger circuit 13 for exciting a flash emission tube Xe, and a flash controller circuit 14. The DC/DC converter 11 comprises an oscillating transistor Q1, two switching transistors Q6 and Q7, six resistors R1, R2, R18, R19, R20, and R21, an oscillation transformer T1, and a diode D5. The oscillation transformer T1 is provided with a primary coil P, two secondary coils S1 and S2, and an auxiliary coil F. The secondary coil S1 is coupled by a rectifier diode D3 to the main capacitor C3. In the above circuit, the supply voltage Vcc is boosted, rectified by the diode D3, and fed to the main capacitor C3 for charging. The main capacitor C3 is connected to the trigger circuit 13 for exciting the flash emission tube Xe and to the flash emission tube Xe by a delay circuit consisting of a coil L and a diode D4. Also, it is communicated with a resistor R22 and a zener diode ZD2 coupled to a terminal ZD1 for detection of charge completion. The delay circuit is inserted for preventing abrupt flow of charge from the main capacitor C3 to the flash emission tube Xe so that excessive emission of flash light caused by e.g. a delay in the microcomputer 1 can be attenuated.

The trigger circuit 13 comprises a capacitor C4, a resistor R4, and a transformer T2. The secondary coil S2 of the oscillation transformer T1 is coupled by a rectifier diode D2 to the constant voltage generator circuit 12 which is arranged for supplying a constant voltage to the flash controller circuit 14. The constant voltage generator circuit 12 comprises a transistor Q2 of which collector is connected to the cathode of the diode D2, a zener diode ZD1 coupled at cathode to the base of the transistor Q2 and at anode to the ground, a resistor R3 coupled between the collector and base of the transistor Q2, and a capacitor C2 coupled to the emitter of the transistor Q2 for acting as a drive source for the flash controller circuit 14. The flash controller circuit 14 is arranged for controlling the emission of flash light of the flash emission tube Xe through switching ON and OFF an IGBT and comprises four transistors Q3, Q4, Q5, and Q8 and ten resistors R8 to R17.

The winding of both the secondary coils S1 and S2 of the transformer T1 is adapted so that the capacitor C2 can be charged to a voltage level required for actuating the IGBT when the main capacitor C3 is charged to a desired voltage level for emission of flash light from the flash emission tube Xe.

In FIG. 13, when the terminal FCO is set to "L" state, the transistors Q7, Q6, and Q1 turn ON and the DC/DC converter 11 starts operating, thus charging the capacitor C3. Also, power is fed from the secondary coil S2 to the constant voltage generator circuit 12 which in turn energizes the flash controller circuit 14 for setting into a flash ready state. When the shutter release action of the camera is triggered by activating a releasing means, the shutter starts opening with a sequence of actions. The microcomputer 1 shifts the terminal TRGO to "L" state at proper timing. The transistors Q8, Q5, and Q4 are then turned ON, feeding a voltage through the resistor R8 to the gate of the IGBT which then turns ON. Hence, a charge current from the capacitor C4 flows to the primary coil of the transformer T2 which in turn generates a trigger pulse from the secondary coil. As the result, the flash emission tube Xe is energized by a discharge current from the capacitor C3 and starts emission of flash light.

Then, when the terminal TRGO is shifted to "H" level, the transistor Q3 turns ON thus switching OFF the transistors Q8, Q5, and Q4. Upon the transistor being Q3 switched ON, the IGBT is connected at the gate to the ground thus turning OFF. Accordingly, the flow of a discharge current to the flash emission tube Xe is interrupted and the emission of flash light stops. When the transistors Q8, Q5, and Q4 are turned OFF, no discharge from the capacitor C2 will be permitted through the transistor Q4, the resistor R8, and the transistor Q3. Through controlling an input pulse to the terminal TRGO at appropriate timing, a desired intensity of flash light can be emitted. In addition, a series of flash lights can be emitted continuously.

Figure 14A:
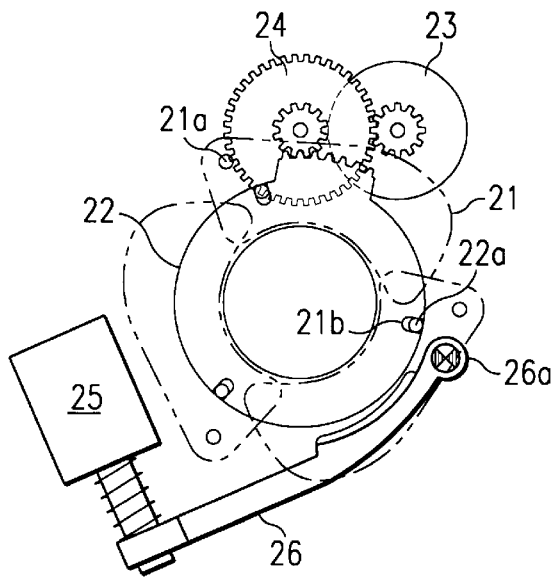
FIGS. 14A, 14B, and 14C are views showing the arrangement and action of a shutter mechanism of the camera.
Figure 14B:
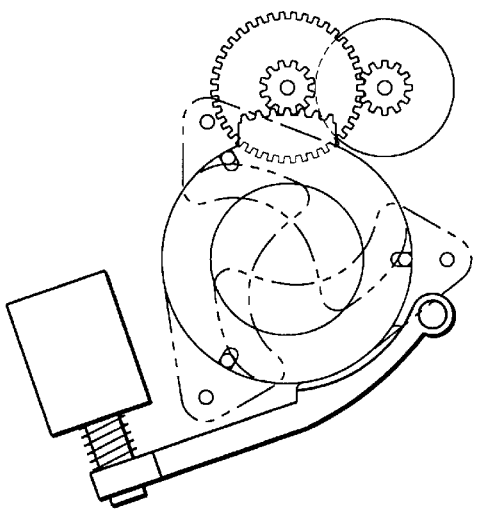
Figure 14C:
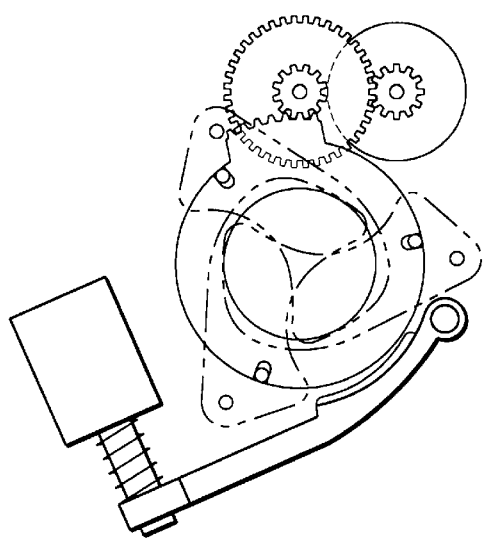

FIGS. 14A, 14B and 14C illustrate an arrangement of the shutter mechanism of the camera which can vary an aperture diameter and a shutter time simultaneously. The arrangement and its action will be described in more detail.

The shutter mechanism of the camera comprises three shutter blades 21, a sector gear 22 engaged with the shutter blades 21 for acting as a member of the shutter blades actuator, a drive stepping motor 23 (identical to M1 shown in FIG. 1), a reduction gear 24, a plunger 25 driven by a magnet Mg which is excited when the shutter aperture reaches a desired size, and a brake lever 26 coupled to the plunger 25 for applying the brake to the sector gear 22. Also, the stepping motor 23 will be braked by a control signal from the microcomputer 1 when the shutter aperture becomes the desired size.

In operation, the shutter release button is pressed down and the stepping motor 23 starts rotating clockwise from its shutter closing position shown in FIG. 14C. Then, the reduction gear 24 turns counterclockwise causing the sector gear 22 to rotate clockwise. Each of the shutter blades 21 has a pivot pin 21a thereof mounted to a base, not shown, for pivotal movement of the blade and a slot 21b arranged therein for accepting a pin 22a of the sector gear 22. Hence, as the sector gear 22 rotates, the shutter blades 21 turn in a counter-clockwise direction thus opening a shutter aperture for exposure.

When the shutter aperture becomes a desired size, the stepping motor 23 is braked and simultaneously, the plunger 25 is energized by a current. The brake lever 26 coupled at one end to the plunger 25 then rotates clockwise about its pivot pin 26a mounted at the other end thereof and comes into direct contact with the sector gear 22. Accordingly, the shutter drive mechanism is braked correctly and securely, whereby the generation of ringing will be prevented and the desired shutter aperture will be obtained with accuracy. At the end, the shutter remains as shown in FIG. 14B.

For closing the shutter blades 21, the plunger 25 is turned OFF and the stepping motor 23 is rotated counter-clockwise to its original position shown in FIG. 14C. FIG. 14A shows the shutter fully opened, in which the shutter aperture is defined by the center opening of the sector gear 22 and no braking action with the lever 26 is needed.

The foregoing arrangement employs the stepping motor 23 for shutter drive. Another shutter mechanism arrangement provided with a bimorph (piezoelectric) device for conducting the shutter movement will now be described referring to FIGS. 15 and 16.

Figure 15:
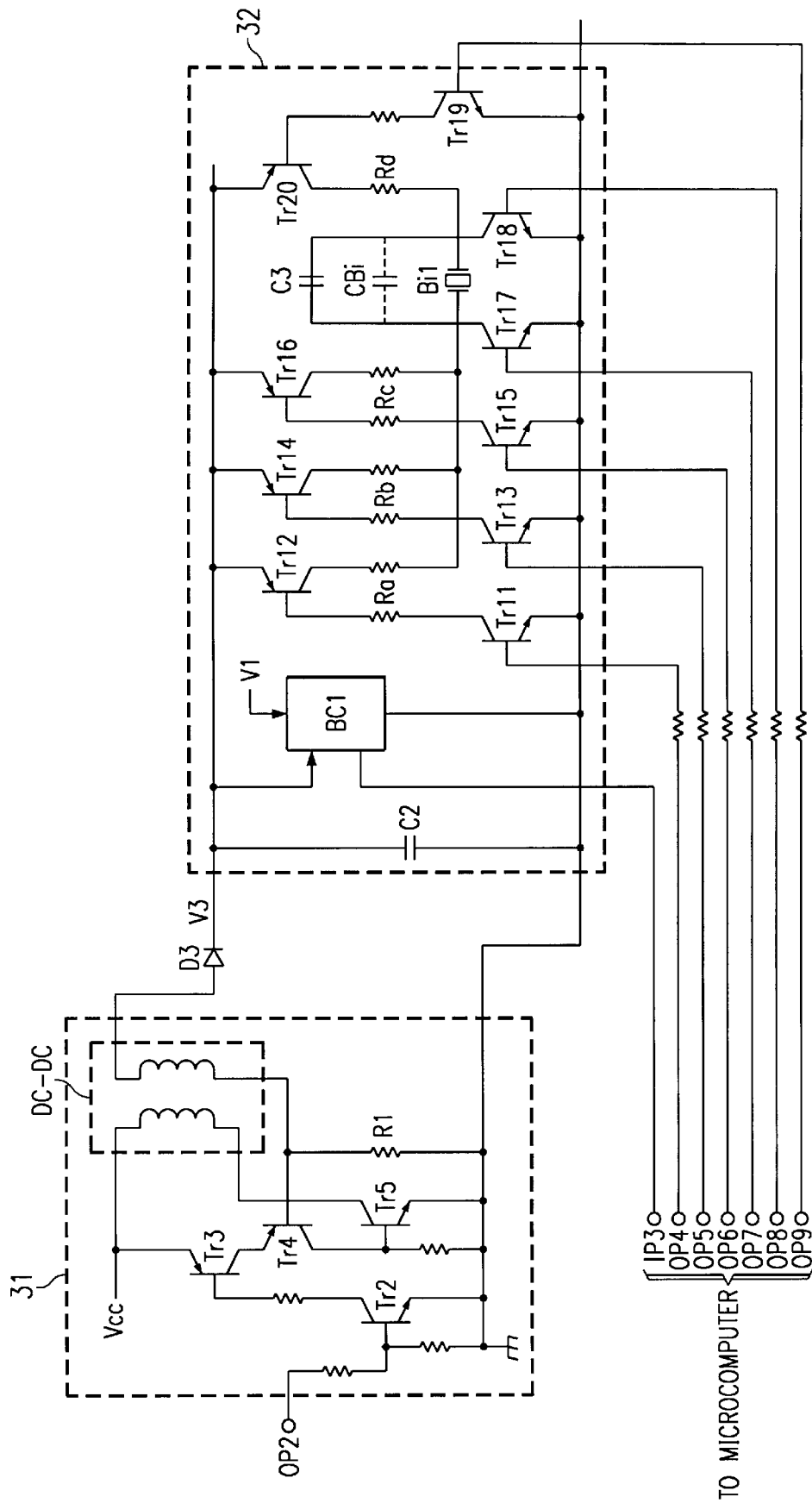
FIG. 15 is a circuit diagram for controlling the shutter movement with a bimorph device.
Figure 16:
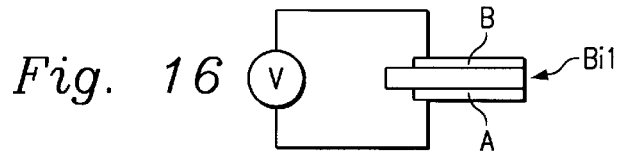
FIG. 16 is a view showing a principle construction of the dimorph device.

FIG. 15 is a diagram of a shutter control circuit containing the bimorph (piezoelectric) device and FIG. 16 shows a principle arrangement of the bimorph device. The bimorph device Bi1 has a metal substrate sandwiched between two piezoelectric elements A and B. When a voltage is applied to one of the two piezoelectric elements, the bimorph device Bi1 bends in one direction. This action is used for actuating the shutter blades. The shutter control circuit shown in FIG. 15 comprises a booster circuit 31 containing five transistors Tr1 to Tr5, a resistor 1, and a DC/DC converter DC—DC and an exposure controller circuit 32 containing two capacitors C2 and C3, a voltage detector circuit BC1, ten transistors Tr11 to Tr20, and a bimorph device Bi1.

In operation, a boosted voltage of the secondary coil of the DC/DC converter DC—DC is fed to a diode D3 and further transmitted as a voltage V3 to the exposure controller circuit 32. The exposure controller circuit 32 is arranged in which a storage voltage to the capacitor C2 for storage of an electric charge is detected by the voltage detector circuit BC1, the capacitor C3 is coupled in parallel to the bimorph device Bi1, and the transistors Tr11 to Tr20 are connected for producing control signals.

The voltage detector circuit BC1 upon detecting an input voltage of 200 V outputs an H-level detection signal to an input terminal IP3 of the microcomputer 3. Then, the microcomputer 1 turns OFF a boost control transistor in the booster circuit 31 to stop the voltage boosting action. The operation of the transistors Tr11 to Tr20 for applying the input voltage to the bimorph device Bi1 will now be explained.

The collector of the transistor Tr18 is connected to the piezoelectric element B, shown in FIG. 16, of the bimorph device Bi1. When the transistors Tr11, Tr12, and Tr18 are turned ON, the piezoelectric element B is grounded and the other element A is loaded with a 200-volt voltage supplied through a resistor Ra and the transistor Tr12. Accordingly, given amounts of electric charge are stored in the capacitor component CBi of the bimorph device Bi1 and the capacitor C3 coupled in parallel to the capacitor component CBi. As the charged voltage increases high, the bimorph device Bi1 becomes bowed with time and thus, the shutter will be opened gradually. The capacitor C3 is intended for controlling the amplitude of the bend with time which tends to increase ununiformly due to a small capacitance of the capacitor component CBi of the bimorph device Bi1.

When the input voltage to the bimorph device Bi1 reaches 200 V, the bimorph device Bi1 remains at its ultimate state. If an exposure value is obtained before the input voltage to the bimorph device Bi1 comes up to 200 V, the transistors Tr11 and Tr12 are turned OFF and then, the transistor Tr17 is turned ON. Consequently, the bimorph device Bi1 is short-circuited thus closing the shutter. Although the shutter is closed and the exposure control is stopped, the bimorph device Bi1 remains not returned back to its initial state due to its hysteresis characteristic.

For shifting back to its initial state, the bimorph device Bi1 is applied with a reverse voltage. In practice, the transistor Tr18 is turned OFF and the transistors Tr19 and Tr20 are turned ON. Then, the potential of the piezoelectric element B becomes higher than that of the element A. For prevention of an excessive bend resulting from abrupt application of a voltage to the bimorph device Bi1, a resistor Rd is interposed between the collector of the transistor Tr20 and the piezoelectric element B of the bimorph device Bi1. As being slowly applied with a voltage, the bimorph device Bi1 bends back in the reverse direction. When it returns to its initial state (cf. this action is detected by a switch located at the initial point), the transistors Tr19, Tr20, and Tr17 are turned OFF thus ceasing the application of voltage. This procedure of control will be executed at every photographing action.

The flow of a current into the bimorph device Bi1 is controlled by a combination of the transistors Tr11 and Tr12 and the resistor Ra, a combination of the transistors Tr13 and Tr14 and a resistor Rb, and a combination of the transistors Tr15 and Tr16 and a resistor Rc respectively. By selecting a desired combination of the transistors, the shutter opening characteristic can be controlled.

Figure 17:
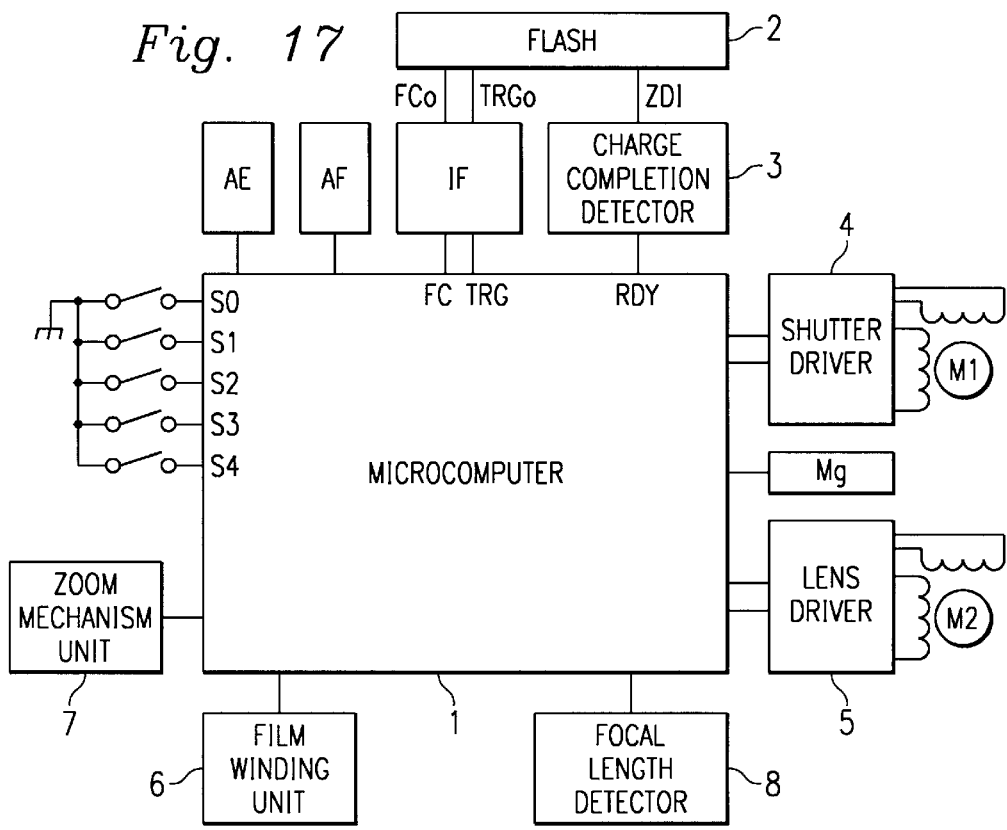
FIG. 17 is a block diagram of a circuitry arrangement of a camera capable of varying full aperture value.
Figure 18A:
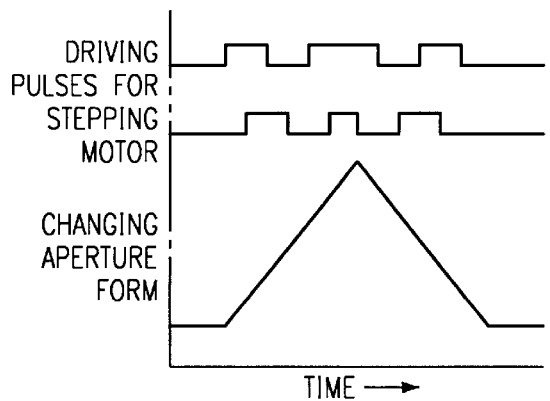
FIG. 18A is a view showing signal waveforms of driving pulses and changing form of larger aperture.
Figure 18B:
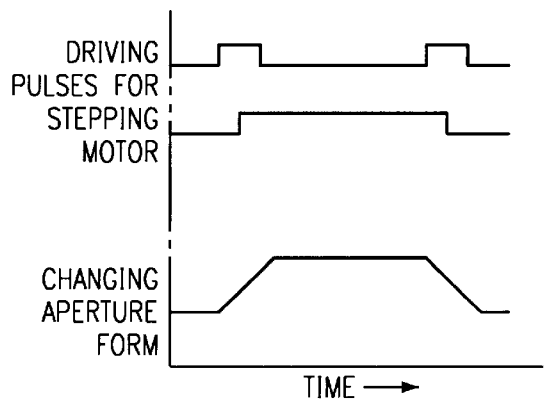
FIG. 18B is a view showing signal waveforms of driving pulses and changing form of smaller aperture.

Another camera will be described which has a shutter driven by a stepping motor like the foregoing camera, and a variable full aperture value. FIG. 17 shows a block diagram of a circuitry arrangement of the camera, in which the switch S5 for photographing mode selection shown in FIG. 1 is replaced with a detector 8 for detecting the focal length of a lens. In action, the number of open pulses and the stop time of the stepping motor is determined by the object brightness and the exposure is executed at a given shutter speed and a given aperture size. The pulse width of the camera is fixed to 2 m sec. Using a combination of the open pulse number and the stop time, the relation between the shutter speed and the aperture size can be varied. For example, when the open pulse number is decreased while the stop time is increased, a smaller aperture size and a slower shutter speed are given (See FIG. 18B). If the open pulse number is increased and the stop time is decreased, a larger aperture size and a faster shutter speed are obtained (See FIG. 18A).

The aperture control on a common lens-shutter camera (with fixed aperture) and a full-aperture variable lens-shutter camera will be explained.

Figure 19:
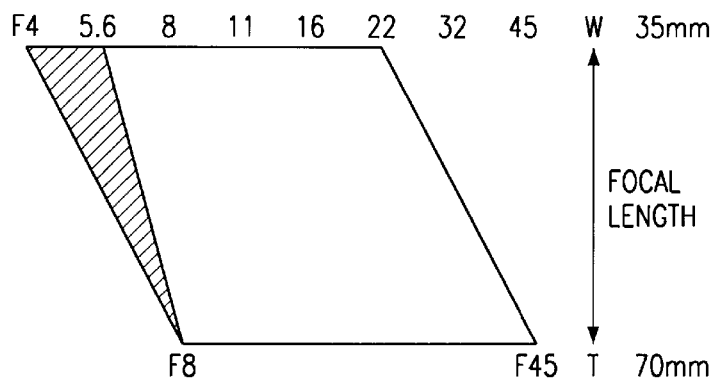
FIG. 19 is a view showing relation between F number and focal length on a zoom lens of the common lens-shutter camera or the full-aperture variable shutter-lens camera.

FIG. 19 shows the relation between F number and focal length on a zoom lens of the common lens-shutter camera or the full-aperture variable lens-shutter camera.

When the zoom lens of the common lens-shutter camera is shifted from short to long focal length, its aperture value varies. The aperture value is calculated from focal length divided by aperture diameter and when the shutter aperture remains unchanged during variation in the focal length, will be varied systematically. FIG. 19 shows that the full aperture value is F4 and the smallest aperture value is F22 at short focal length (35 mm), and the former is F8 and the latter is F45 at the long focal length (70 mm).

As apparent, the aperture is fixed at each position by the zooming ratio, which will thus give a limitation to design the optical lens system. The present invention however allows the full aperture to be varied as the focal length changes (for example, the aperture control area denoted by the oblique hatching in FIG. 19 is not used, thus providing more flexibility in the optical system designing.

Figure 20:
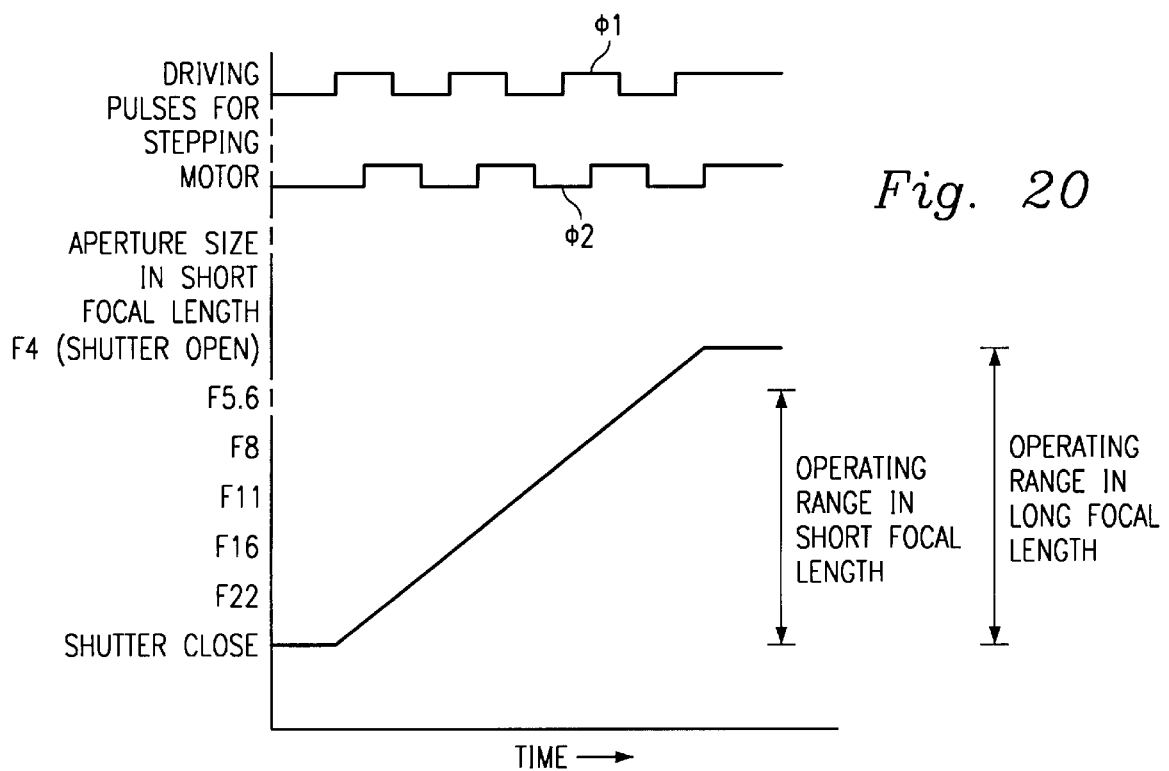
FIG. 20 is a view showing relation between open pulse and F number of a shutter.

The relation between open pulse and F number of the shutter of the camera of the second embodiment will be described. The shutter of the camera is full open by 14 open pulses, as illustrated in FIG. 20. The aperture diameter is decreased by a step per two pulses and the maximum number of the open pulse of shutter is varied in accordance with a change of the focal length. For example, if the focal length is 70 mm in a lens system like that shown in FIG. 19, the shutter is controlled within a range of aperture value (F45 to F8) corresponding 3 to 14 open pulses and thus, the full aperture value becomes F8. If the focal length is 35 mm, the shutter is controlled within a range of aperture F22 to F4 corresponding 3 to 12 open pulses and the full aperture value becomes F5.6.

The movement of the shutter of the camera is similar to that shown in the flow chart of FIG. 9. However, the pulse width is constant (2 ms) and the standard mode is only provided for photographing. The assignment of the ROM table for open pulse number and stop time is equal to that shown in FIG. 10B. The values of the open pulse number and the stop time are however different corresponding to a kind of the lens. The microcomputer (of the camera contains a plurality of such ROM tables for selection of the optimum ROM table depending on a focal length of the lens to be set. More specifically, the open pulse number and the stop time are predetermined and stored in a memory in which, for example, if the focal length is 70 mm, the open pulse ranges 3 to 14 pulses, if it is 35 mm, the open pulse ranges 3 to 12 pulses, and if it is 50 mm, the range is from 3 to 13 pulses. Accordingly, the maximum aperture diameter of the shutter is smaller at 35 mm than at 70 mm. As the shutter is controlled in this manner, the full aperture value can vary without using any mechanical action linked with a change in the focal length.

Figure 21:
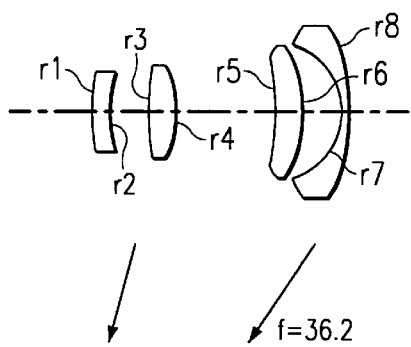
FIG. 21 is a view showing an arrangement of the optical system of the camera.

FIG. 21 illustrates an optical system of the full-aperture variable camera. The specification of a lens group shown in FIG. 21 is listed in Tables 3 and 4.

The shape of an aspherical surface X(y) and the shape of a spherical surface Xo(y) for reference are defined by the following equations:

$$X(y) = (r/\varepsilon)\{1 - \varepsilon \cdot y^2/r^2)^{1/2}\} + \sum_{i \geq 2} Aiy^i$$

$$Xo(y) = r \cdot \{1 - \varepsilon(y^2/r^2)^{1/2}\}$$

where r is a reference curvature radius of the aspherical surface, $\varepsilon$ is a parameter of the secondary surface, and Ai is an aspherical surface coefficient. Also, r is a radius of paraxial curvature of the aspherical surface, expressed by $(1/r)=(1/r)+2A_2$.

The optical characteristics of the lens group described in FIG. 21 are shown in FIGS. 25A–25I.

As described above, when the F number at the wide-angle range is increased, i.e. the aperture size is reduced, a zoom lens assembly can be constructed with a less number of lenses and also, the flux of light on the optical axis can be decreased in diameter thus averaging up an off-center illuminance. Thereby, a declination in the limb light of a flash emission, which is a critical drawback in wide-angle photographing, will be compensated by the characteristics of the optical system. When the F number at the telephoto range is lowered, the distance of flash illumination can be increased. In this respect, the F number of a zoom lens of this arrangement shown in FIG. 21 is increased at the wide-angle range and decreased at the telephoto range, as compared with those of a conventional aperture fixed type arrangement.

Figure 22:
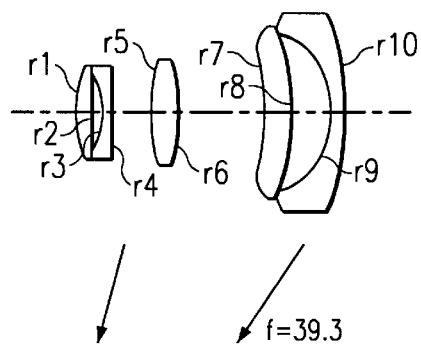
FIG. 22 is a view showing another arrangement of the optical system.

FIG. 22 shows another optical system of the full-aperture variable camera, in which pseudo soft focus photographing in addition to the standard mode can be executed through varying the full aperture at the same focal length. The specification of a lens unit of the optical system are as shown in Tables 1 and 2.

Figure 23A:
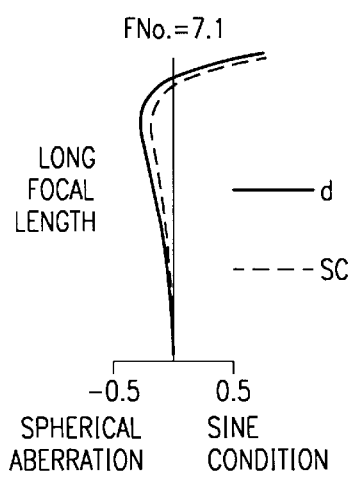
FIGS. 23A, 23B, and 23C are characteristic diagrams of soft focus photographing with the optical system shown in FIG. 22.
Figure 23B:
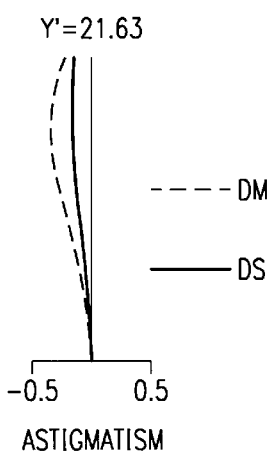
Figure 23C:
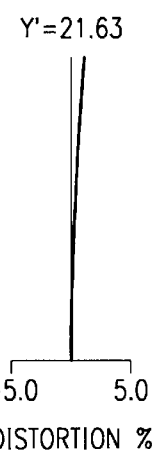
Figure 24A:
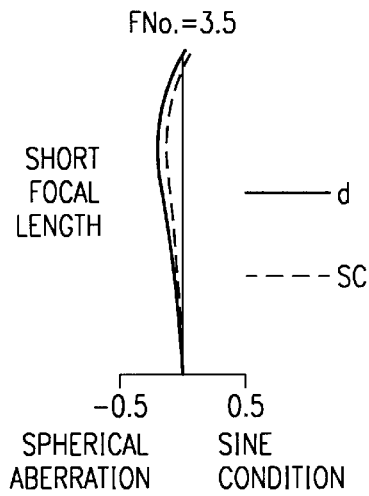
FIGS. 24A, 24B, and 24C-24I are characteristic diagrams of normal photographing with the same optical system.
Figure 24B:
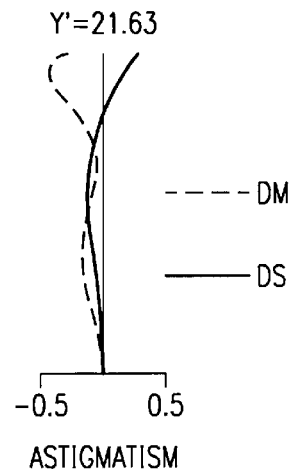
Figure 24C:
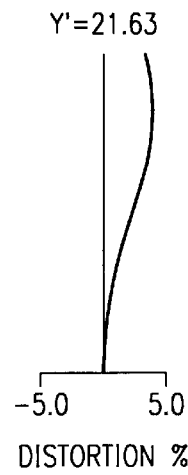
Figure 24D:
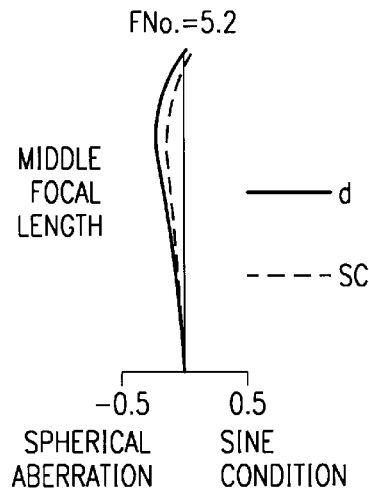
Figure 24E:
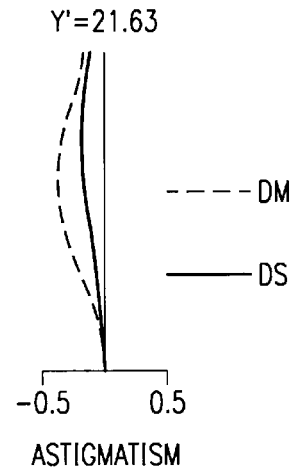
Figure 24F:
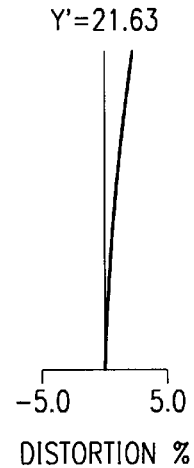
Figure 24G:
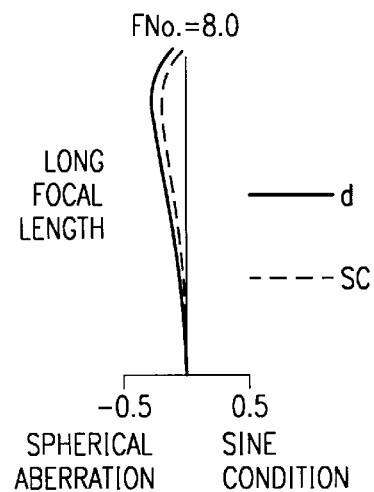
Figure 24H:
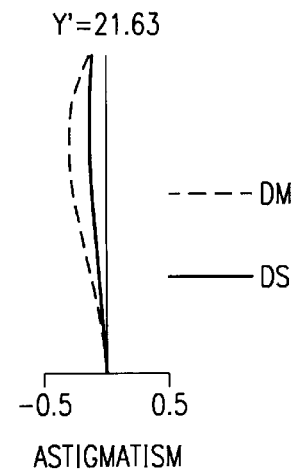
Figure 24I:
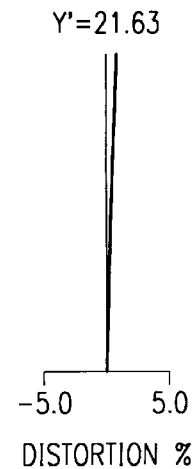
Figure 25A:
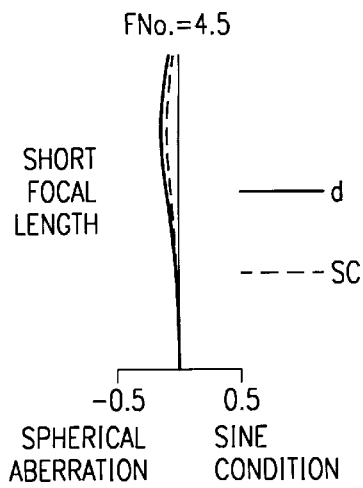
FIGS. 25A, 25B, and 25C-25I are characteristic diagrams of normal photographing with the optical system shown in FIG. 21.
Figure 25B:
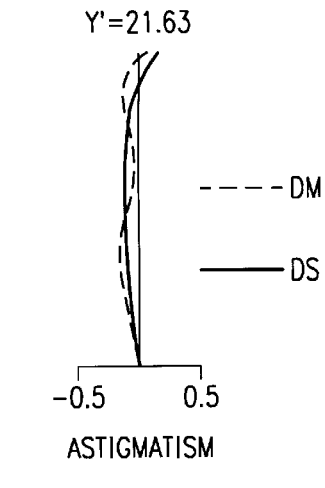
Figure 25C:
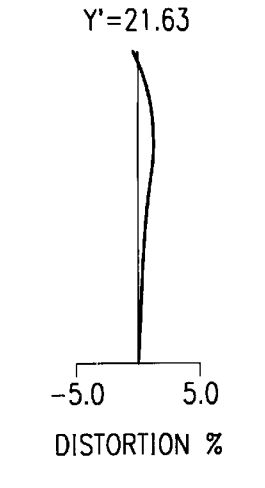
Figure 25D:
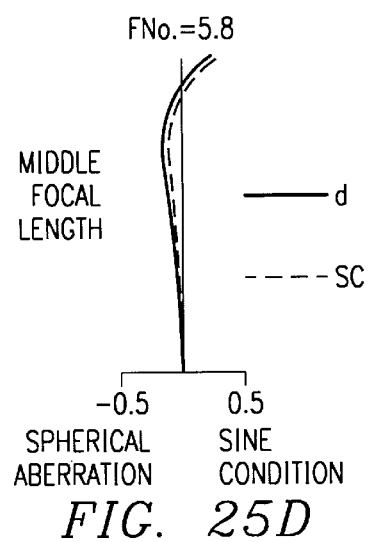
Figure 25E:
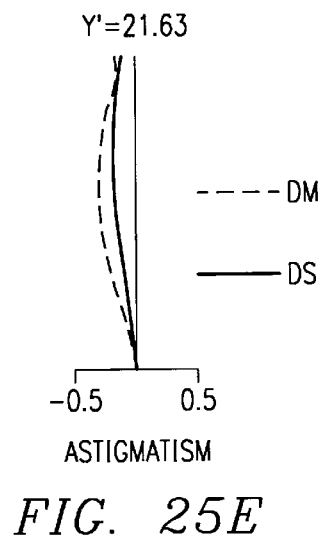
Figure 25F:
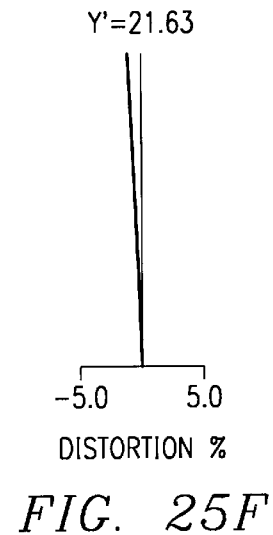
Figure 25G:
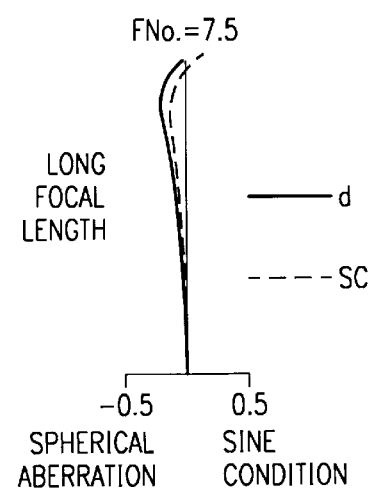
Figure 25H:
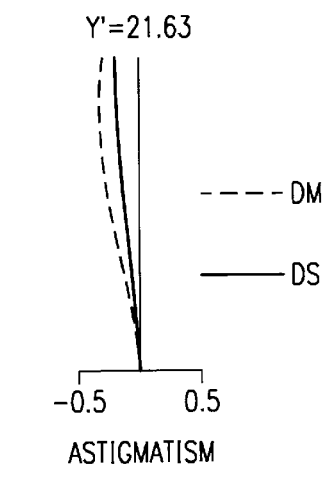
Figure 25I:
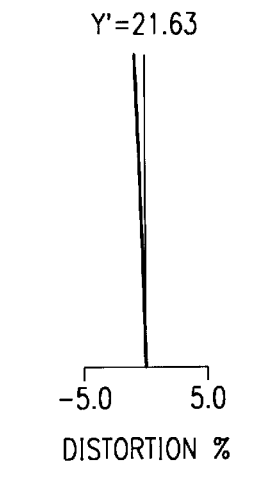

The optical characteristics of the lens group of FIG. 22 in the pseudo soft focus mode are shown in FIGS. 23A–23C and the same in the standard mode is shown in FIGS. 24A–24I. FIGS. 23A–23C only exhibit telephoto results, in which the wide-angle and middle range results are similar to those shown in FIGS. 24A and 24B and are not shown. In the standard mode, the F numbers from 3.5 at wide angle to 8.0 at telephoto are commonly used for full exposure. If the pseudo soft focus mode is chosen, a wider aperture than the normal is needed at the telephoto range. For producing a pseudo soft focus effect, the spherical aberration is corrected to an over rate within the marginal. It would be understood that other aberrations than the spherical aberration are corrected in the same manner as of the exposure control in the standard mode.

Although the spherical aberration is over-corrected in this lens arrangement for having pseudo soft focus effects, it may be under-corrected with equal success. The pseudo soft focus effects can be realized not only in the telephoto range but also in the middle or wide-angle range. In particular, a pseudo soft focus picture will be taken more favorably and beautifully at the telephoto range.

The present invention is also feasible with the use of a shutter shown in FIG. 15. Equal effects are obtained through controlling a duration from the shutter opening to a given aperture size by switching on Tr11, Tr12, and Tr18 to the shutter closing by switching off Tr11 and Tr12 and on Tr17.

Also, the present invention is not limited to the two discrete shutters described above, and any shutter capable of Maintaining its shutter blades at appropriate positions during the closing and opening states will be employed with equal success. For example, a shutter driven by a supersonic motor AS depicted in U.S. Pat. No. 4,989,030, may be incorporated in the present invention.

Although the plunger device is installed in the aforementioned stepping motor driven shutter mechanism for preventing unwanted vibration of the shutter blades, it will be omitted in the arrangement of a shutter which hardly contains a vibration of the shutter blades and requires no such vibration preventing means. No vibration preventing means is needed, provided that the shutter driven by a stepping motor has shutter blade thereof arranged for moving with negligible vibration.

TABLE 1

| | f = 39.3–58.5–86.6 | | FNo. = 3.5 | Abbe |
|---|---|---|---|---|
| | curvature radius | spacing on optical axis | index of refraction(Nd) | number (vd) |
| r1* | 23.799 | d1 1.800 | N1 1.51680 | v1 64.20 |
| r2 | 281.900 | d2 1.400 | | |
| r3 | −18.355 | d3 1.000 | N2 1.77551 | v2 37.90 |
| r4 | −103.438 | d4 4.675 | | |
| r5 | 28.346 | d5 3.650 | N3 1.51680 | v3 64.20 |
| r6* | −16.057 | d6 11.961–7.209–4.040 | | |
| r7* | −38.985 | d7 4.000 | N4 1.71736 | v4 29.42 |
| r8 | −32.892 | d8 6.000 | | |
| r9* | −10.697 | d9 1.044 | N5 1.75450 | v5 51.57 |
| r10 | −37.458 | | | |

Σd = 35.530

TABLE 2 aspherical coefficient r1: $\epsilon$ = 0.25000 D+01
  A4 = −0.52378 D−05,  A6 = −0.12372 D−07
  A8 = 0.27882 D−09,
r6: $\epsilon$ = 0.0
  A4 = 0.39596 D−04,  A6 = 0.55255 D−07
  A8 = −0.51195 D−09,  A10 = −0.71142 D−11,
  A12 = 0.24917 D−12,
r7: $\epsilon$ = 0.10000 D+01
  A4 = 0.47003 D−04,  A6 = 0.19984 D−06
  A8 = −0.29870 D−09,  A10 = −0.38127 D−10,
  A12 = 0.40789 D−12,
r9: $\epsilon$ = 0.10000 D+01
  A4 = 0.33871 D−05,  A6 = 0.96533 D−07
  A8 = −0.46244 D−08,  A10 = −0.79087 D−10,
  A12 = 0.14023 D−12,

TABLE 3 f = 36.2–53.0–77.5    FNo. = 4.5    Abbe

| | curvature radius | | spacing on optical axis | | index of refraction(Nd) | number (vd) |
|---|---|---|---|---|---|---|
| r1* | 28.708 | d1 | 2.300 | N1 | 1.58340 | ν1 30.23 |
| r2 | 12.092 | d2 | 3.819 | | | |
| r3 | 34.481 | d3 | 4.200 | N2 | 1.49300 | ν2 58.34 |
| r4 | −10.838 | d4 | 13.968–7.950–3.850 | | | |
| r5* | 29.336 | d5 | 3.680 | N3 | 1.49300 | ν3 58.34 |
| r6 | −20.652 | d6 | 4.768 | | | |
| r7 | −10.486 | d7 | 1.000 | N4 | 1.72000 | ν4 50.31 |
| r8 | −31.800 | | | | | |

Σd = 33.735

TABLE 4

Σd = 33.735
aspherical coefficient r1: $\epsilon$ = 0.95451 D+00
  A4 = −0.36511 D−03, A5 = −0.55737 D−05, A6 = 0.10614 D−06
  A7 = 0.13568 D−08, A8 = −0.12031 D−08, A9 = −0.48998 D−10, A10 = −0.44352 D−11, A11 = −0.40059 D−12
  A12 = −0.37045 D−13,
r2: $\epsilon$ = 0.12970 D+01
  A4 = −0.29932 D−03, A5 = −0.41555 D−05, A6 = 0.83528 D−06
  A7 = 0.10008 D−06, A8 = 0.74052 D−08, A9 = 0.50208 D−10, A10 = 0.15672 D−11, A11 = −0.56148 D−13
  A12 = −0.17952 D−13,
r4: $\epsilon$ = 0.12069 D+01
  A4 = 0.34345 D−04, A5 = −0.36562 D−06, A6 = 0.15340 D−06
  A7 = 0.25656 D−07, A8 = 0.23567 D−08, A9 = 0.62535 D−10, A10 = 0.37394 D−11, A11 = 0.16968 D−12
  A12 = 0.17440 D−14,
r5: $\epsilon$ = 0.97187 D+00
  A4 = 0.81203 D−04, A5 = −0.45223 D−05, A6 = 0.64148 D−06
  A7 = 0.44672 D−07, A8 = −0.18322 D−08, A9 = −0.23925 D−10, A10 = 0.38308 D−12, A11 = 0.41811 D−12
  A12 = 0.79040 D−13,

What is claimed is:

1. A camera provided with an aperture controllable shutter having a diaphragm, comprising:

a photographing lens having a variable focal length to be set in a desirable focal length, the full open aperture diameter thereof being constant as the focal length varies so that the full open aperture value thereof is varied;

a detector which detects the set focal length of the lens;

a first decision means for determining the extent to which the aperture diameter is capable of being controlled toward an opening direction of the aperture controllable shutter in accordance with the focal length detected by said detector;

a light metering device which measures the brightness of an object to be taken;

a driving mechanism which actuates the diaphragm of the aperture controllable shutter for opening the aperture;

a second decision means for determining the movement of the diaphragm of the aperture controllable shutter in accordance with the full-aperture diameter determined by the first decision means and the object brightness measured by said light metering device; and a controller which controls the driving mechanism corresponding to the movement of the diaphragm determined by said second decision means.

2. A camera as claimed in claim 1, wherein the driving mechanism is a stepping motor.

3. A camera as claimed in claim 1, wherein the driving mechanism is a piezoelectric device.

4. A camera provided with an aperture controllable shutter having a diaphragm, comprising:

a photographing lens having a variable focal length to be set in a desirable focal length, the full open aperture diameter thereof being constant as the focal length varies so that the full open aperture value thereof is varied;

a detector which detects the set focal length of the lens;

a first decision means for determining a program line from a plurality of program lines, which have different full-aperture diameters, respectively, in accordance with the focal length detected by said detector;

a light metering device which measures the brightness of an object to be taken;

a driving mechanism which actuates the diaphragm of the aperture controllable shutter for opening the aperture;

a second decision means for determining the movement of the diaphragm of the aperture controllable shutter in accordance with the program line determined by the first decision means and the object brightness measured by said light metering device; and a controller which controls the driving mechanism corresponding to the movement of the diaphragm determined by said second decision means.

5. A camera as claimed in claim 4, wherein the driving mechanism is a stepping motor.

6. A camera as claimed in claim 4, wherein the driving mechanism is a piezoelectric device.

7. A camera as claimed in claim 1, wherein the full-aperture diameter when the focal length is longest is larger than the full-aperture diameter when the focal length is shortest.

8. A camera as claimed in claim 4, wherein the full-aperture diameter when the focal length is longest is larger than the full-aperture diameter when the focal length is shortest.

9. A camera provided with an aperture controllable shutter having a diaphragm, comprising:

a photographing lens having a variable focal length to be set in a desirable focal length;

a pulse generator which generates a pulse train;

a stepping motor which drives the diaphragm in response to the pulse train generated by said pulse generator toward an opening direction of the aperture controllable shutter, wherein said aperture controllable shutter is fully opened upon generation of a predetermined number of pulses;

a detector which detects the set focal length of the lens; and a controller which controls said pulse generator so that the number of pulses supplied to said stepping motor is restricted less than said predetermined number of pulses in response to the focal length detected by said detector.

10. A camera as claimed in claim 9, wherein said controller controls said pulse generator so that the number of pulses generated by said pulse generator is restricted.

* * * * *